United States Patent [19]

Schmidt et al.

[11] 4,335,492

[45] Jun. 22, 1982

[54] METHOD OF ALIGNING A COLOR TUBE CONE AND APPARATUS FOR CARRYING OUT THE METHOD

[75] Inventors: Peter Schmidt, Denkendorf; Otto Brunn, Wernau; Dieter Forker, Esslingen; Willi Schmidt, Berglen, all of Fed. Rep. of Germany

[73] Assignee: International Standard Electric Corporation, New York, N.Y.

[21] Appl. No.: 93,957

[22] Filed: Nov. 14, 1979

[30] Foreign Application Priority Data

Nov. 22, 1978 [DE] Fed. Rep. of Germany ....... 2850602

[51] Int. Cl.³ ............................................. B23Q 3/00

[52] U.S. Cl. .................................. 29/25.13; 269/908

[58] Field of Search .................... 29/25.13; 269/321 T

[56] References Cited

U.S. PATENT DOCUMENTS 3,285,457 11/1966 Peterson .......................... 220/2.1 A
3,369,881 2/1968 Bennett et al. .............. 220/2.1 A X
3,806,108 4/1974 Adachi et al. .............. 269/321 T X

*Primary Examiner*—Joseph H. McGlynn
*Attorney, Agent, or Firm*—John T. O'Halloran; Peter C. Van Der Sluys

[57] ABSTRACT

Heretofore, the tube neck, the seal edge extending along the largest circumference of the funnel section, and reference pads located at or near the seal edge have been aligned relative to each other. It is proposed to align the seal edge, the reference pads, and the tube neck in relation to the longitudinal axis of a "transition section" (portion between neck-funnel seal and position of deflection on the funnel yoke) in such a way that the axis perpendicular to the plane bounded by the seal edge and the reference pads, the longitudinal axis of the neck coincide with the longitudinal axis of the "transition section".

5 Claims, 3 Drawing Figures

METHOD OF ALIGNING A COLOR TUBE CONE AND APPARATUS FOR CARRYING OUT THE METHOD

The present invention relates to a method of aligning a colour tube cone of the type that includes a neck intended to house an electronic-gun system, a funnel section having reference pads and a seal edge along the largest circumference, and a transition section which corresponds to the portion extending from the neck joint to the diameter of the funnel section where a deflection system is mounted on the finished tube, and to apparatus for carrying out the method.

A very stringent requirement imposed on colour-picture tubes is that the undeflected, central electron beam should strike the screen exactly at the centre and at a right angle. Failure to meet this requirement has direct adverse affects on the colour purity of the tube and may also result in a displacement of the raster on the screen.

German Auslegeschrift (DE-AS) No. 25 36 531 proposes a method which permits the tube neck to be aligned very acurately in relation to the seal edge and the reference pads. First, the seal edge and the reference pads are ground. The cone is then placed with this seal edge on a support and aligned with the aid of the reference pads after which an alignment mandrel is moved into the neck so that its axis is in such a position relative to the reference pads that the area enclosed by the seal edge is hit exactly at the centre and at a right angle. The neck is then heated and aligned by means of jaws attached to the mandrel.

Since new deflection systems have come into use, however, it no longer suffices to align only the seal edge, the reference pads, and the neck relative to each other, but very tight tolerances must also be maintained in the alignment of the transition section between the large-diameter part of the cone and the neck in relation to the last-mentioned parts of the cone. These new deflection systems, one of which is described in "Valvo Entwicklungsmitteilungen, April 1978, 30 AX-Abgleichfreies Farbbildsystem in Passtechnik", extend over a long portion of the neck and very accurately conform to the contour of the transition section.

If the seal edge and the reference pads are ground by the conventional method, it is quite possible that the plane defined by the seal edge is inclined to the axis of the transition section. Being aligned in relation to the seal edge and the reference pads, the neck, too, is inclined to the transition section. It has turned out that on cones made by this method, there is not always a sufficient range of travel to permit the deflection system on a sloping transition section to be so aligned in relation to the neck and the electron-gun system housed therein that convergence and purity errors are eliminated.

Accordingly, the object of the invention is to provide a method which allows the cone to be aligned so that the axes of the neck and, the transition section, coincide with an axis perpendicular to the plane bounded by the seal edge which axis lies in the direction of the electron beams. This object is achieved by a method wherein the longitudinal axis of the transition section is first aligned and fixed in relation to a machine, which machine then grinds the seal edge and reference pads so that an axis perpendicular to the plane bounded by the ground seal edge and the longitudinal axis of the transition section coincide and the neck is aligned by heating the neck joint and then bringing the neck into the correct position so that its axis coincides with the aforementioned axes.

When convergence adjustments are made, variations of the cone, the electron-gun system, and the deflection system must be compensated by adjusting the deflection system. The greatest variations are those of the glass part, i.e., the cone. By the method according to the invention, however, those parts of the cone which are important for convergence, i.e. the neck and the seal edge, are aligned in relation to the longitudinal axis of the transition section, on which the deflection system is mounted. As a result, the whole range of travel of the deflection system on the transition section is available for the compensation of variations of the electron-gun system and of the deflection system itself.

In the conventional methods, the neck is commonly aligned with the seal edge and the reference pads. If machines are present for this alignment, it is advantageous to align the seal edge and the reference pads in relation to the transition section, and then to properly position the neck in relation to the seal edge and the reference pads in the known manner.

If, on the other hand, machines for aligning the seal edge and the reference pads in relation to the neck are present, it is particularly advantageous to first align the longitudinal axis of the transition section in relation to a machine in which the neck is aligned so that its longitudinal axis and the longitudinal axis of the transition section coincide and thereafter the seal edge and the reference pads are aligned with the neck by grinding.

If the cone is held at the transition section and then machined at the seal edge and the reference pads or at the neck, the glass is subjected to high fracture loads and moments. These loads are avoided with an apparatus that consists of two parts, the first of which aligns the colour tube cone at the transition section in relation to a machining device, while the second locks the aligned cone in position. The second part includes at least three supporting jaws which support the colour tube cone at its funnel section as close as possible to the largest circumference against forces acting in the direction of the cone axis and at least two stops which act on the cone near the reference pads and thereby prevent rotation of the cone. The second part also includes clamping jaws which act on the cone near the neck at at least three points and are moved against the neck and locked in position after the alignment of the transition section. The methods and apparatuses can be used both in the fabrication of colour-tube cones and in the recovery of such cones.

The invention will now be described in greater detail, by way of example, with reference to the accompanying drawing, in which.

Figure 1:
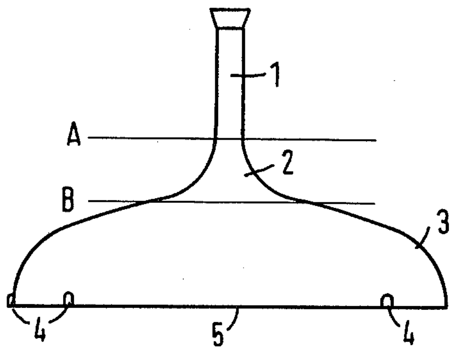
FIG. 1 shows a colour tube cone.

First, the terms used in the following will be explained with the aid of FIG. 1. The cone is composed of the neck 1, the transition section 2, and the front funnel section 3, at which reference pads 4 and a seal edge 5 are provided. The plane A corresponds to the plane in which the neck is attached, and the plane B is the plane in which the deflection system mounted on the cone. Along the line where the plane B intersects with the cone, holding studs for the deflection system may be provided, or a pressed-on glass ring or a cemented plastic ring may be present.

As described at the beginning, in conventional methods the neck and the seal edge are aligned in relation to each other. After the alignment, however, the longitudinal axis of the transition section may still be inclined to the longitudinal axis of the neck. With the tight tolerances maintained in the new tube generation between the deflection system and the transition section, it is not always possible to align the longitudinal axis of the deflection system with the longitudinal axis of the neck, because the inclined transition section impedes the adjustment of the deflection system. The method according to the invention therefore proposes to align the neck and the seal edge with the transition section.

Figure 2:
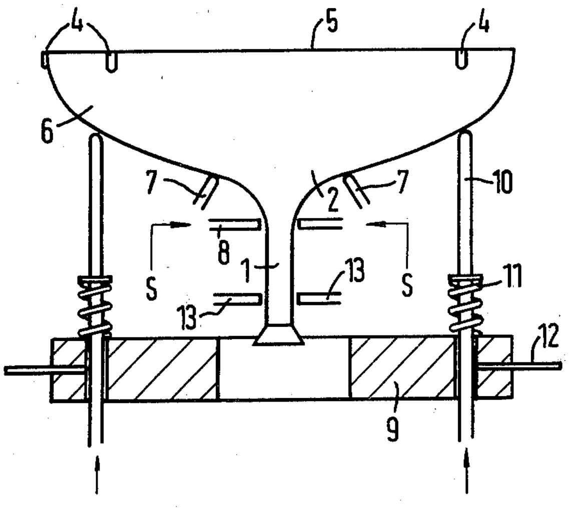
FIG. 2 shows an apparatus for aligning the colour tube cone.

FIG. 2 shows an apparatus for carrying out the method. The cone 6 is placed on three supporting pins 7 whose points of support lie on the diameter of the circle in the plane B. Instead of the supporting pins 7, a ring of suitable diameter may be provided.

Figure 3:
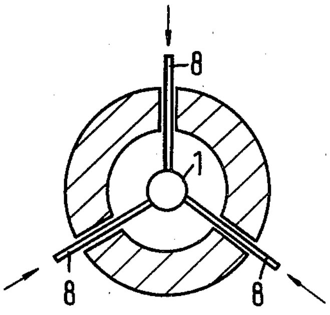
FIG. 3 is a top view of a section taken along line S—S of FIG. 2.

By means of slides 8 acting in a plane parallel to and adjacent the plane A, the longitudinal axis of the transition section 2 is aligned perpendicular to a base plate 9. The guidance of the slides 8 is shown in FIG. 3 in a section along line S—S of FIG. 2.

The plane A is the plane of the neck joint, as shown in FIG. 1. It should be noted here that the slides 8 advantageously do not act exactly at the neck joint because the glass is very uneven there. The transition section 2 is engaged by slides 8 just in front of the joint, where it has a smooth, undeformed surface.

Instead of using slides 8 acting on the outside, a mandrel may be inserted into the neck, with holding parts pressing from inside on the transition section 2 adjacent the plane A and thus aligning the transition section.

If studs, rings, or rings with studs or holes for mounting the deflection system are already provided on the cone in the plane B, the cone will be fixed by means of these members. In this manner, the transition section is securely locked into position, and the slides 8 are no longer necessary. However, the positions of the mounting members must be accurately defined in relation to the axis of the transition section.

The first part of the apparatus, which has been described thus far serves to align the transition section in relation to a reference such as base plate 9.

When the seal edge 5 and the reference areas 4 are to be ground in the next operation, the cone is advantageously supported at points which ensure that it is securely held in place in relation to base plate 9.

Those points on the transition section in relation to which the alignment is performed are located close to the longitudinal axis of the cone, while the seal edge to be ground is that part of the cone located farthest from the longitudinal axis of the cone. If, therefore, the cone were clamped at the alignment points, and the seal edge were then machined by grinding and polishing, the glass would be subjected to high fracture loads. The high moments acting on the cone could also result in misalignment.

The apparatus according to the invention therefore includes a second part which supports the cone against moments applied near the points being machined. Stops near the reference pads 4 prevent rotation. Compressive forces acting in the direction of the cone axis are received by supporting jaws which act on the outside of the cone as far from the cone axis as possible. In the embodiment of the invention, at least three rods 10 are provided which are movably guided in the base plate 9 via springs 11 during the alignment of the transition section, and are locked via locking members 12 at the end of the alignment. These rods may, of course, also be designed to act on the cone surface in a direction perpendicular thereto. Analagously, the jaws 13 at the rear end of the neck are movable during alignment and locked after alignment.

Following the alignment of the transition section and the fixing of the cone at points lying far outside, the seal edge and the reference pads are machined with a grinding device. This grinding device does not form an essential part of the invention and, therefore, is not shown in the drawing; however, the grinding device is properly aligned with the base plate 9 so that the ground seal edge and reference pads are aligned with the transition section.

After the seal edge and the reference pads have thus been aligned with the transition section by machining, the neck can be aligned with the seal edge and the reference pads by one of the conventional methods.

It is also possible, however, to remove the jaws 8 and 13 after the above-described alignment and fixing of the cone and to heat the neck near the plane A. A mandrel whose axis coincides with the longitudinal axis of the transition section is then inserted into the neck and aligns the latter so that the longitudinal axis of the neck coincides with the longitudinal axis of the transition section.

The essential features of the invention are first the alignment of the transition section and then the machining of at least the seal edge and the reference pads or alignment of the neck so that the seal edge or neck is aligned with the transition section.

The part still to be machined or aligned can then be machined or aligned either in relation to the transition section, or in relation to the already aligned part.

It is, of course, also possible to seal on the neck only after the cone has been aligned relative to the transition section. For alignment, the cone is then held in the plane A at the point where the neck portion is cut off before the actual neck is attached.

What is claimed is:

1. A method of aligning a colour tube cone of the type including a neck intended to house an electron-gun system, a funnel section having reference pads and a seal edge along the largest circumference, and a transition section which corresponds to the portion extending from the neck joint to the diameter of the funnel section where a deflection system is mounted on the finished tube, said method comprising the steps of:

aligning the circumferential seal edge and the reference pads so that a plane defined by the seal edge is perpendicular to a longitudinal axis of the transition section; and aligning the neck so that a longitudinal axis of the neck coincides with the longitudinal axis of the transition section.

2. A method as described in claim 1, wherein the step of aligning the circumferential seal edge and the reference pads comprises the step of grinding said circumferential seal edge and reference pads.

3. A method as described in claims 1 or 2, wherein the longitudinal axis of the transition section is first aligned and fixed in relation to a machine in which the neck is aligned so that its longitudinal axis and the longitudinal axis of the transition section coincide and thereafter the seal edge and the reference pads are ground so that the plane of the seal edge is perpendicular to the axes.

4. A method as described in claim 1, wherein the step of aligning the neck includes the steps of heating the neck joint and thereafter bringing the neck axis into the proper alignment with the transition section axis.

5. A method as described in claims 2 or 4, wherein the longitudinal axis of the transition section is first aligned and fixed in relation to a machine which grinds the seal edge and reference pads so that the axis of the transition section is perpendicular to the plane defined by the ground seal edge and thereafter the neck is aligned so that its axis is perpendicular to the plane of the seal edge and coincides with the axis of the transition section.

* * * * *